United States Patent
Kosowsky

[11] 3,765,019
[45] Oct. 9, 1973

[54] PASSIVE RADAR GLIDE SLOPE ORIENTATION INDICATION

[75] Inventor: Lester H. Kosowsky, Stamford, Conn.

[73] Assignee: United Aircraft Corporation, East Hartford, Conn.

[22] Filed: Mar. 20, 1972

[21] Appl. No.: 236,047

[52] U.S. Cl. .................................. 343/5 LS, 343/17
[51] Int. Cl. ........................... G01s 9/52, G01s 7/06
[58] Field of Search ................... 343/5 GC, 5 LS, 17

[56] References Cited
UNITED STATES PATENTS

| | | | |
|---|---|---|---|
| 2,426,218 | 8/1947 | Hopgood, Jr. | 343/5 LS |
| 2,572,043 | 10/1951 | McElhannon | 343/17 |
| 3,181,153 | 4/1965 | Cella | 343/5 LS |
| 2,644,155 | 6/1953 | Emmett, Jr. | 343/5 LS |
| 3,729,737 | 4/1973 | Asam | 343/5 LS |

Primary Examiner—Benjamin A. Borchelt
Assistant Examiner—H. A. Birmiel
Attorney—Melvin Pearson Williams

[57] ABSTRACT

Selected ones of a sequence of radar reflectors disposed adjacent to a runway are oriented in such a fashion that the relative direction vector between an aircraft approaching a runway and illuminating the reflectors with its radar can be determined to be too high, too low, or too far to the right or left by failure to receive a response from those of the reflectors oriented to provide a response only within certain angles of a preferred approach vector. The glide slope orientation may be viewed directly on a radar scope, or presented as discrete indications of failure to be within the prescribed vector. Range gating the response is also disclosed.

6 Claims, 12 Drawing Figures

PATENTED OCT 9 1973 3,765,019

RIGHT ON

TOO HIGH

TOO LOW

TOO FAR LEFT

TOO FAR RIGHT

LOW AND RIGHT

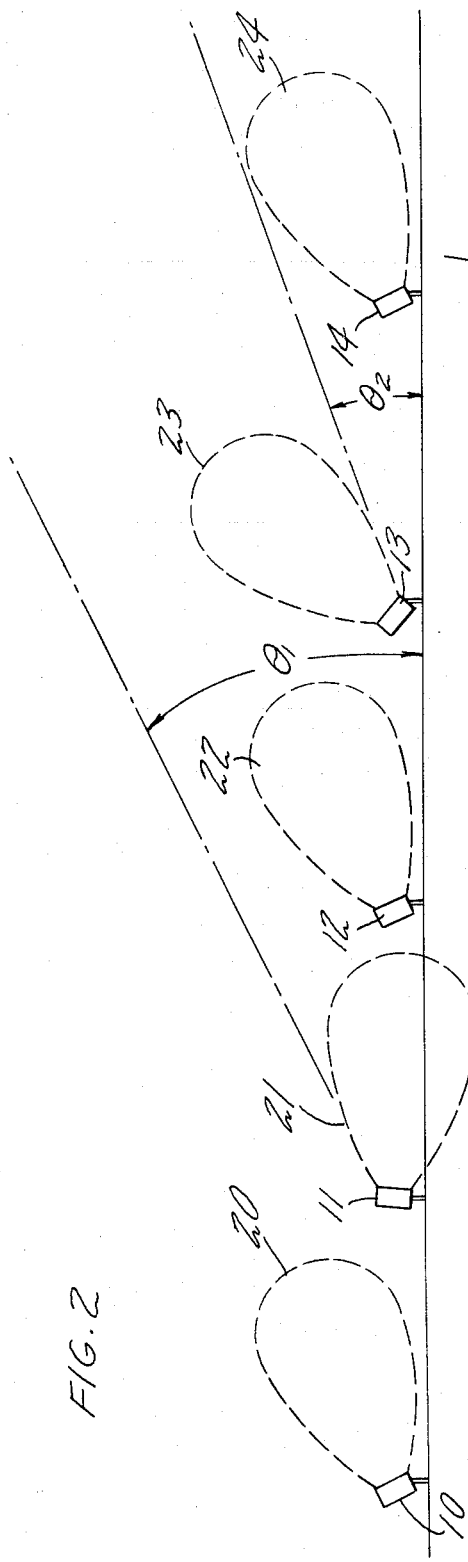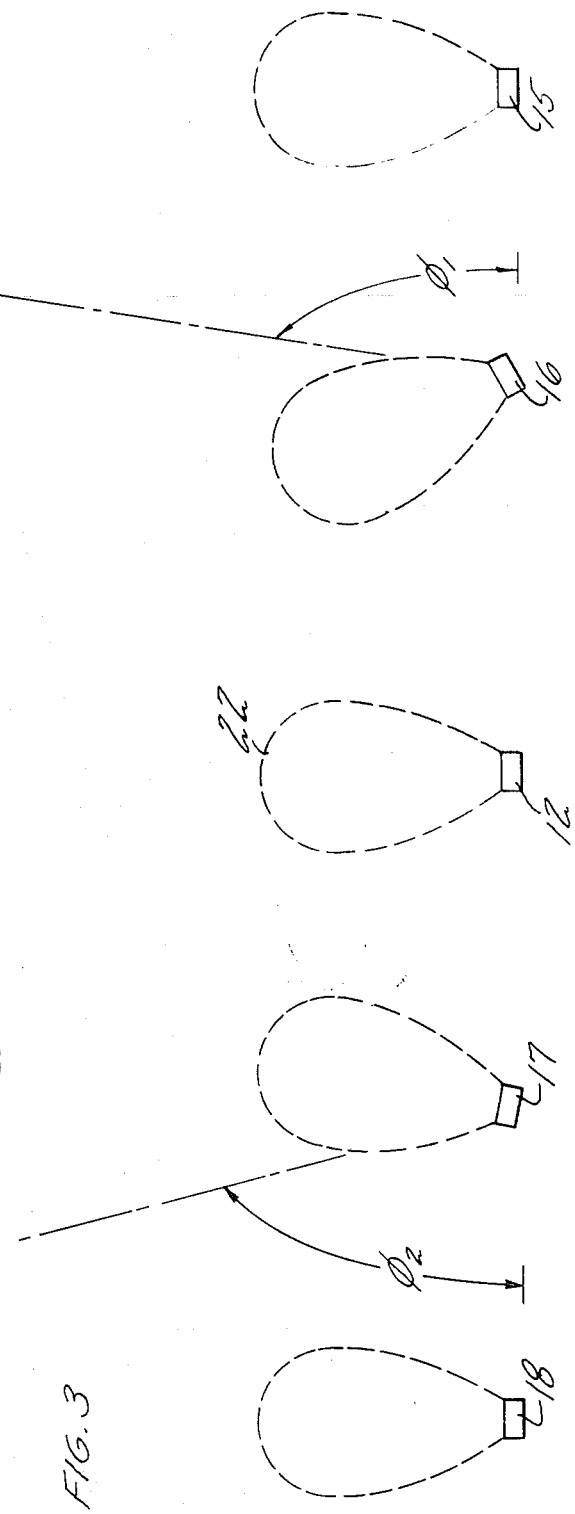
FIG. 2
FIG. 3

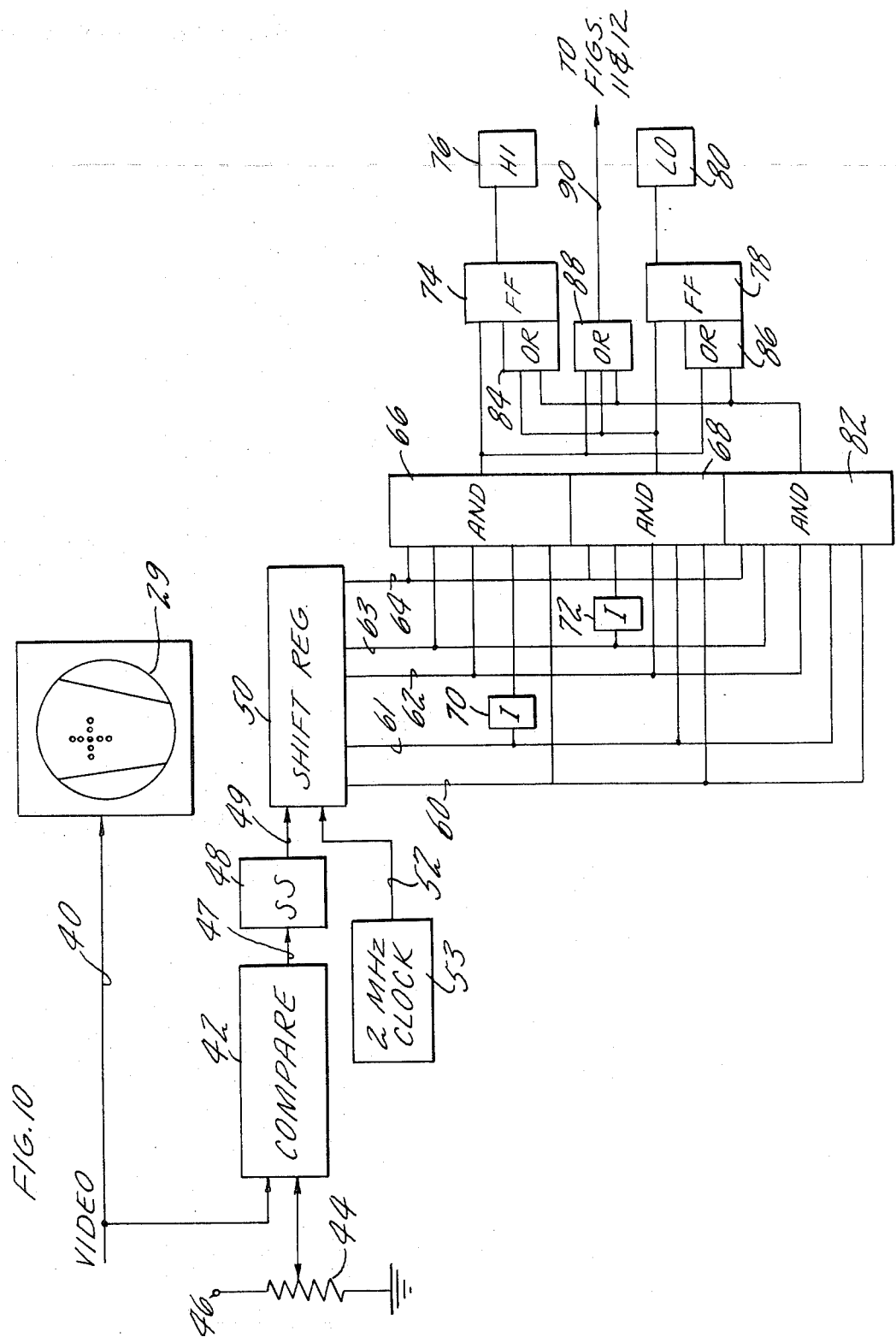

PASSIVE RADAR GLIDE SLOPE ORIENTATION INDICATION

BACKGROUND OF THE INVENTION

1. Field of Invention

This invention relates to electronic aircraft landing aids, and more particularly to a passive radar glide slope orientation indication.

2. Description of the Prior Art

Although instrument landing systems (ILS) are provided at all major commercial airports in most countries today, there are still a plethora of airports having commercial air traffic which do not include instrument landing systems. At such airports, the procedure is to fly to a minimum permissible ceiling when believed to be in the vicinity of the airport, and to attempt to pick up the airport visually and make a visual landing thereat. If visual contact is not made when the minimum altitude is obtained, landing is prohibited.

Over the years, many forms of simple landing assists instrumentation have been proposed. However, none of these have found wide acceptance due to various factors such as cost, lack of reliability, or the requirement that each aircraft contain complex equipment in order to complete the system.

SUMMARY OF INVENTION

The object of the present invention is to provide an indication of the orientation of an aircraft with respect to a runway which it is approaching with an intent to land, of a relatively simple and inexpensive type which does not require additional complex equipment aboard each aircraft making use thereof.

According to the present invention, a plurality of reflectors disposed adjacent a runway are oriented so that several of them which will provide an intense reflection of the aircraft radar signal in the direction of the aircraft whenever the aircraft is anywhere near a reasonable vector toward the approach end of the runway, and at least two other reflectors oriented so that one of them will provide no response when the aircraft is slightly off the vector in one direction, and the other will provide no response when the aircraft is slightly off the vector in an opposite direction, thereby to provide a discrete indication of the aircraft's position with respect to a proper approach vector to the runway. In accordance further with the invention, indications may be provided for the glide slope, or for azimuth, or both. In still further accord with the present invention, the indication of the direction by which the aircraft is off a desired vector may be visually presented on a radar scope, or through simple signal processing may be presented on discrete indicators. In accordance still further with the invention, the approximate range to the reflectors (and therefore to the approach-end of the runway) can be determined through signal processing by monitoring the time it takes after a transmitted radar pulse before a discrete return pattern is sensed.

By the simple expedient of providing reflectors with suitably broad response to fit the weather radars of commercial aircraft using the airport, and simply utilizing a visual indication on the radar scope of intense returns received from the array of reflectors, the invention provides landing approach vector indications without any need for airborne equipment. Use of an array that gives a coded pattern avoids confusion with other strong return signals, such as may be reflected from a metal building. In order to provide discrete indications, and/or range to the reflectors, only extremely simple apparatus need be mounted on each aircraft utilizing same. The invention is therefore well suited to providing assistance in the landing of aircraft at airfields not provided with instrument landing systems, with or without the addition of airborne equipment to the aircraft using same.

Other objects, features and advantages of the present invention will become more apparent in the light of the following detailed description of preferred embodiments thereof, as illustrated in the accompanying drawing.

BRIEF DESCRIPTION OF THE DRAWING

FIG. 2 is a side elevation view of some of the reflectors illustrated in FIG. 1 showing the antenna reflection patterns thereof;

FIG. 3 is a plan view of others of the reflectors illustrated in FIG. 1 showing the reflectance pattern thereof;

FIG. 10 is an illustrative, simplified block diagram of exemplary circuits for providing discrete indications of the aircraft approach vector;

DESCRIPTION OF THE PREFERRED EMBODIMENT

Figure 1:
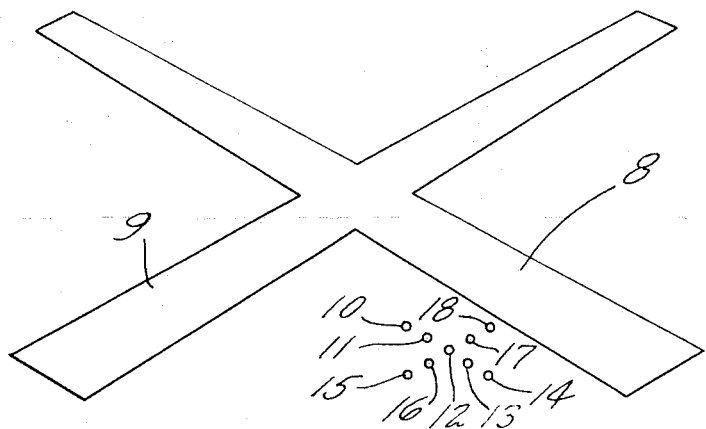
FIG. 1 is a simplified perspective of crossed runways at an airfield and an array of reflectors disposed thereat in accordance with the present invention.

Referring now to FIG. 1, an airport is depicted as including a pair of crossed runways 8, 9 with a plurality of radar reflectors 10–18 disposed adjacent the lower right end of the runway 8. The reflectors 10–18 comprise an embodiment of the present invention which can provide runway approach vector information both as to glide slope and azimuth, as described more fully hereinafter. The reflectors 10–14 provide glide slope information in a manner illustrated in FIG. 2. Therein, the reflectors 10, 12 and 14 are oriented in such a fashion as to reflect radar energy which impinges thereon from the weather radar (or other radar transmitter on the aircraft) in patterns 20, 22, 24 which are directed toward the aircraft, provided the aircraft is reasonably close to a proper approach vector to the related end of a corresponding runway. On the other hand, the reflector 11 is oriented so that its reflection pattern 21 is considerably downward from that of the reflectors 10, 12 and 14. Thus it has associated with it an angle $\theta_1$ defining the maximum slope at which the aircraft can approach the end of the runway and still receive reflections therefrom. If the aircraft altitude is too high so that its slope is too steep, then it will receive no reflected radiation from the reflector 11. Similarly, the reflector 13 is oriented upwardly so that its pattern 23 will provide no response to the aircraft below an angle $\theta_2$, indicating that the aircraft is too low and its glide slope is too shallow. The patterns 21, 23 of the reflectors 11, 13 will otherwise provide responses to the aircraft whenever the aircraft is at a glide slope in which it could receive responses from the reflective patterns 20, 22, 24 of the antenna reflectors 10, 12, 14, respectively. The reflectors 10-14 are provided with a suitably broad pattern in azimuth so as to provide signals to the aircraft even though its heading is off by a small amount from a proper vector to the end of the runway.

As seen in FIG. 3, the reflectors 16 and 17 are oriented at an angle in azimuth such that the reflectors 16 will provide no response to the aircraft if it is too far to the left, and the reflector 17 will provide no response to the aircraft it is too far to the right whereas the reflectors 12, 15 and 18 will provide responses to the aircraft if it is reasonably close to a proper approach vector to the end of the runway. Note that the reflector 12 serves as a central reflector for both the glide slope array (including reflectors 10, 11, 13 and 14) as well as to the azimuth array (including reflectors 15, 16, 17 and 18).

Figure 4:
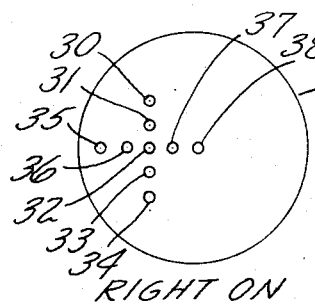
FIGS. 4–9 are simplified illustrations of indications of aircraft approach vectors as viewed on a radar scope.
Figure 5:
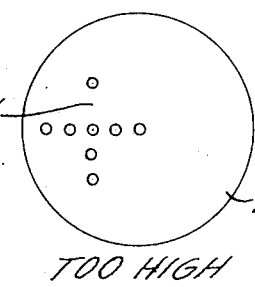
Figure 6:
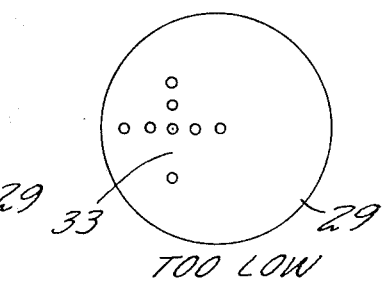
Figure 7:
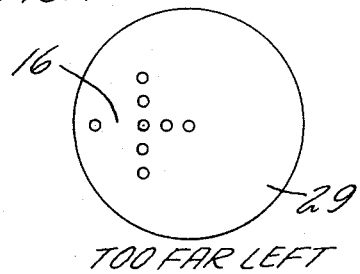
Figure 8:
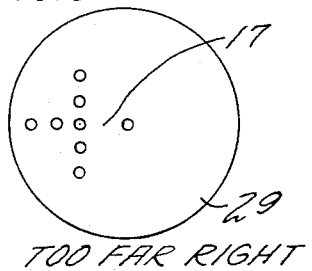
Figure 9:
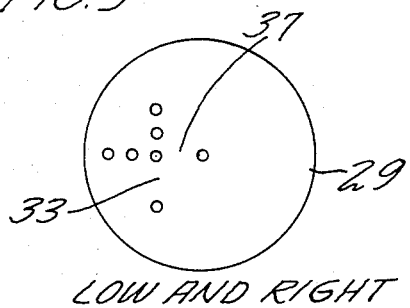

If the vector is so far off that no response can be received from the reflectors 10, 12, 14 or from the reflectors 15 and 18, then the aircraft would either continue perfecting the approach, or would veer off and attempt another approach. In this regard, landing practice at airfields employing the present invention may provide regulations such that if a suitable pattern (including at least reflections from the reflectors 10, 12, 14, 15 and 18) is not achieved before minimum non-visual-contact altitude is reached, then the landing approach has to be broken off. Visual indications which are received from the various antennae are shown in FIG. 4. Therein, a bright return signal (30-38, hereinafter referred to as a blip) from each reflector indicates that the vector is right on, and the landing approach may be continued. In FIG. 4, the blip 30 indicates a strong return signal from the antenna 10, the blip 31 indicates a strong signal from the antenna 11, and so forth. On the other hand, if the aircraft is reasonably well oriented with the end of the runway, but is slightly too high, then the aircraft will not be in the reflective pattern 21 of the antenna 11 so that no blip 31 will be presented on the radar scope as indicated in FIG. 5. This provides a simple indication that the aircraft is too high. If the aircraft is too low, as shown in FIG. 6, then no blip 33 will be received due to the fact that the aircraft will not be within the reflective pattern 23 of the reflector 13. Similarly, the cases of being too far to the left or too far to the right are illustrated in FIGS. 7 and 8. FIG. 9 illustrates that if the aircraft is too low and too far to the right, then the blips 33 and 37 will both be missing indicating that the aircraft is out of the reflective patterns 23 and 27 of the reflectors 13 and 17, respectively. Thus, visual indications on a regular radar scope can be achieved quite simply with the present invention.

It should be noted that the illustrations of FIGS. 4-9 and the illustration of the radar scope 29 of FIG. 10 ignore other reflections which may be received in the vicinity. However, as is known, there is little return from runways and the land immediately surrounding the runways of airports. Thus, strong signals from reflectors will be very pronounced on the radar scope when in the vicinity of the approach end of a runway fitted with the present invention. On the other hand, if found necessary or desirable, either the transmitted power of the weather or other radar could be reduced, or the threshold requirement for causing a video response in the radar scope 29 could be increased, if desired, so as to cause the return signals to clearly stand out. Because a coded pattern is used, confusion with other strong reflections is avoided. The patterns 20-28 illustrated in FIGS. 2 and 3 are obviously over simplified; such patterns would extend many miles from the end of the runway. However, the effect is as illustrated in FIGS. 2 and 3.

By providing additional equipment on an aircraft, which intends to use an airport having an installation in accordance with the present invention, digital or discrete indications of the aircrafts's vector with respect to a correct approach vector may be provided. An exemplary, simplified circuit for providing high and low indications is illustrated in FIG. 10. Therein, the video signal from the radar is provided on a signal line 40 to the radar scope 29. The video signal on the line 40 may also be digitally monitored to sense a discrete pattern of signals, separated in time by amounts commensurate with the interreflector spacing of the reflectors is received by the radar. This may be achieved, in one simple embodiment of the invention, by passing the video signal to a compare circuit 42, the other input of which may suitably be taken from a potentiometer 44 having a proper voltage applied to a terminal 46 thereof so as to provide a threshold signal level to the comparator 42. In this way, the comparator 42 will provide a discrete output signal on a line 47 only when the return signals on the video line exceed the threshold signal provided by the potentiometer 44 (or any other suitable threshold voltage source). The threshold level (the setting of the potentiometer) may be so adjusted that only extremely strong return signals are passed through the comparator 42. The likelihood of a sequence of signals in any way corresponding with a pattern of signals from the reflectors being received by the radar receiving antenna is quite remote, and in fact even if it occurs, is of little consequence as can be determined by operation of the apparatus as described hereinafter. The output of the comparator 42 on the line 47 may be applied to a single shot (monostable multivibrator) 48, and then over a line 49 to a shift register 50, the clocking input of which may be provided on a line 52 by a clock circuit 53. The clock circuit 53 is shown in FIG. 10 to have a frequency of 2 MHz, which corresponds to a period of one half microsecond which is approximately equal to the time it takes a radar wave to travel a distance of 500 feet. By spacing the reflectors 10-14 250 feet apart, the shift register 50 will be clocked at intervals which represents the difference in round trip time of radar signals reflected from successive ones of the reflectors 10-14. To avoid the necessity of synchronizing the two MHz clock 52 with the primary radar transmitted pulse, and the distance from the aircraft to the reflectors, the single shot 48 having an on-time of just under one half microsecond can stretch the output of the compare circuit 42 so as to ensure that the shift register 50 will be clocked only once for each operation of the compare circuit 43. The timing is not significant so long as the shift register 50 is able to respond discretely to five successive ones of the clock pulses 53 in a manner so as to receive a recognizable one of the three distinct patterns which the reflectors will return to the aircraft when it is either close to a proper glide slope or right on it. Similarly, the output of the two MHz clock 53 may preferably be suitably shaped so as to have a pulsewidth less than the interpulse spacing of the output of the single shot 48 when it is energized successively by pulses spaced a half microsecond apart, to avoid having a single setting of the single shot 48 gated into the shift register 50 twice. The output of the shift register 50 is provided on a plurality of lines 60–64 to logical decode circuitry. The output on the line 60 corresponds to the time of the receipt of the last signal in the pattern which is from the reflector 10, and the output 64 corresponds to the receipt of the first signal in the pattern which is from the reflector 14, etc. The signal lines 60–64 are applied to a pair of AND circuits 66, 68 which decode the pattern of signals established in the shift register so as to sense the too high and too low indications from the reflectors. The lines 60 and 62–64 are applied without inversion to the AND circuit 66, but the line 61 is passed through an inverter 70 before being applied to the AND circuit 66. Thus the AND circuit 66 will operate only in response to a pattern of 10111 from the reflectors 10–14 respectively, which corresponds to a glide slope which is too high, as described hereinbefore. Similarly, the AND circuit 68 receives one inverted signal from an inverter 72 in response to a lack of a signal on the line 63. Thus it senses a pattern of 11101 from the reflectors 10–14, respectively. The AND circuit 66 will operate a flip flop 74, the output of which operates a "HI" indicator 76, and the output of the AND circuit 68 operates a flip flop 78 which in turn operates a "LO" indicator 80. Each of the flip flops 74, 78 is reset by a signal from the opposite one of the AND circuits 68, 66, respectively, as well as an AND circuit 82 which responds to all of the signal lines 60–64 so that once a HI or LO reading is established, it can remain established until a low or high or a right-on reading is decoded by the AND circuits 66, 68, 82. To reset the flip flops 74, 78 respective OR circuits 84, 86 are provided. An OR circuit 88 responds to any output of the AND circuits 66, 68, 82 so as to provide a signal on a line 90 which may be utilized for synchronizing other circuitry, as is described more fully with respect to exemplary range determining circuits described with respect to FIGS. 11 and 12 hereinafter.

Thus circuitry of the type illustrated in FIG. 10 may be utilized to provide a video window sensitive to the pattern the signals returned from the reflectors 10–14 which provide an indication of the slide slope of the aircraft with respect to a desired glide slope. Since the distance between the reflectors remains constant, it is this distance which determine the timing of radar return signals received successively therefrom, rather than the absolute range of the aircraft to the reflectors, the circuit of FIG. 10 is operative over a wide variety of ranges and amplitudes. In fact, it may be able to determine the glide slope orientation of the aircraft while the aircraft is still so far from the runway that return signals received from the reflectors represent more or less of a general blob, from which no pattern is discernible. Nonetheless, it should be understood that a radar scope does present an indication of glide slope orientation as a function of signals returned from reflectors and therefore the circuit of FIG. 10 is not necessary in order to practice the invention.

Figure 11:
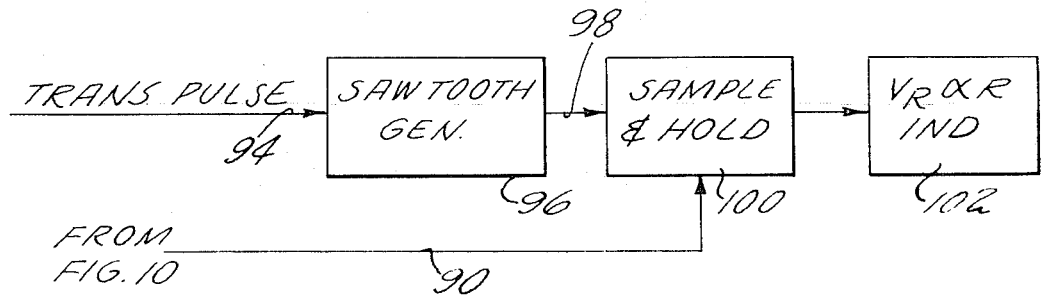
FIG. 11 is a simplified block diagram of an exemplary analog circuit for indicating the range of the aircraft from the reflectors of FIG. 1.

If desired, further signal processing may be utilized in order to determine the range of the aircraft to the array of reflectors from which a recognizable pattern of return signals is received. Such circuitry may be implemented in either analog or digital fashion as illustrated respectively in FIGS. 11 and 12. In FIG. 11, the main transmitter pulse on a signal line 94 is utilized to start a saw tooth generator 96, the output of which is applied over a signal line 98 to a sample and hold circuit 100. The saw tooth generator therefore presents to the sample and hold circuit 100 a voltage which is directly proportional to range. Whenever a signal appears on the line 90 from any one of the AND circuits in FIG. 10, it gates the sample and hold circuit to sample and hold the saw tooth voltage on the line 98. This preserves the voltage for display as an indication of range in an analog indicator 102.

Figure 12:
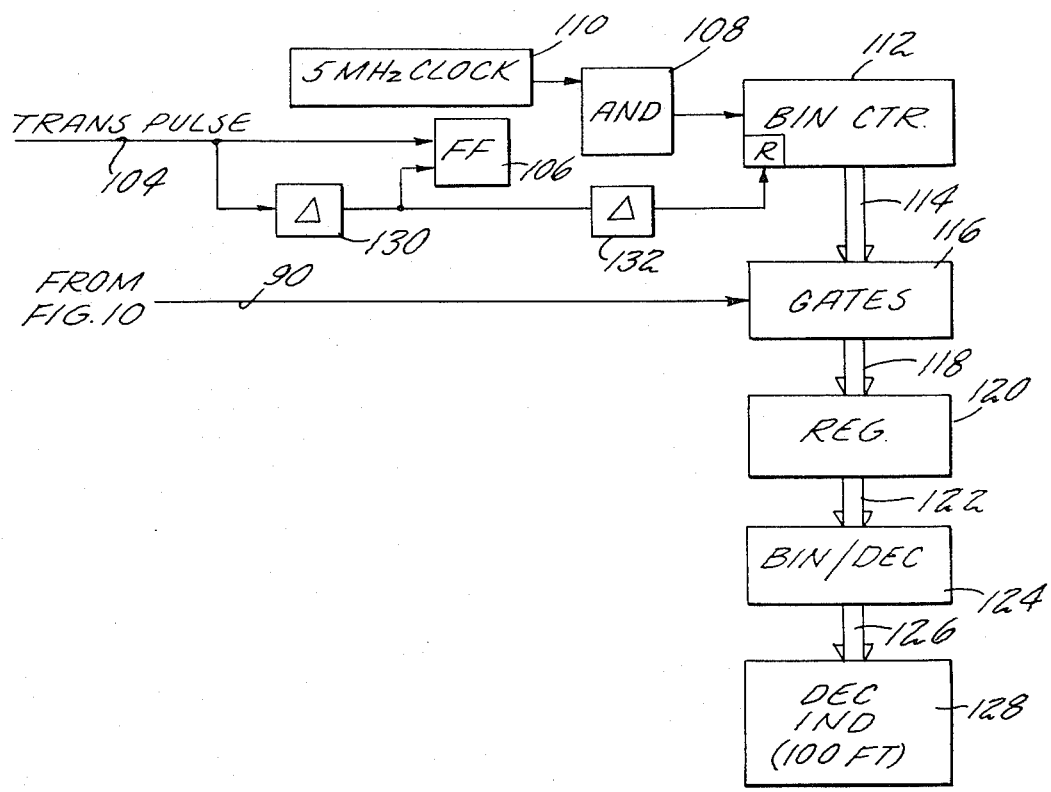
FIG. 12 is a simplified block diagram of a circuit for digitally indicating the range of the aircraft to the reflectors of FIG. 1.

In FIG. 12, an alternative, digital range-determining circuit is illustrated. Therein a signal, derived from the transmitter pulse, is presented from a signal line 104 to set a flip flop 106, at the time that the main transmitted pulse is transmitted, to enable an AND circuit 108 to pass signals from a 5 MHz clock 110 to cause counting in a binary counter 112 at a 5 MHz rate, which corresponds to a distance of 200 feet, which is a round trip of the radar signal of 100 feet. Thus, the binary counter 112 counts time increments equal to a one way distance of 100 feet from the moment of the main transmitted pulse. The output of the binary counter is applied over a trunk of lines 114 to a plurality of gates 116 which are operated in response to a signal on the line 90 from any of the AND circuits in FIG. 10, which signal indicates that a train of video representing a pattern from the array of reflectors 10–14 has been received. At this moment, the gates 116 will pass the count of the binary counter 112 from the trunk of lines 114 over a trunk of lines 118 to a register 120 which will preserve the data until the next time that a suitable reading can be made. The output of the register 120 is passed over a trunk of lines 122 through a binary to decimal decoder 124, the decimal output of which is passed over a trunk of lines 126 to a decimal count indicator 128, the indicated count of which will represent hundreds of feet of range to the array. Resetting of the binary counter may simply be achieved by using signals delayed from the transmitted pulse by an amount equal to the maximum range of the radar so that the flip flop 106 can be turned off in response to a delay circuit 130 which in turn feeds a delay circuit 132 to ensure resetting of the binary counter 112 prior to commencing counting following the next transmitted pulse. In this fashion, it can be assured that the count in the counter represents a time lapse equivalent to hundreds of feet following the occurrence of the main transmitted pulse.

The circuits of FIGS. 10–12 are merely illustrative of circuitry which may be implemented in a wide variety of fashions to suit any desired result, or to accommodate other design parameters of a system which may employ the present invention.

As is known, it is simple, in the navigation of an aircraft, to achieve a desired heading, or to navigate over a particular spot which should represent the beginning of a correct approach to an airfield. A difficult aspect is determining the proper glide slope so as to arrive at the end of the runway with the proper altitude. Similarly, mistakes in heading can be quite readily corrected so long as there is a sufficient distance to the end of the runway in which to do so. However, if the altitude of the aircraft is too high as it approaches the end of the runway, then it must remake the approach; if the altitude is too low, then it may be impossible to reacquire sufficient speed to maintain altitude to the end of the runway, and collisions with obstacles may occur. For this reason, it should be understood that the utilization of the glide slope reflectors 10–14 is more significant than the utilization of azimuth reflectors 15, 16, 12, 17, 18. Thus, the use of reflectors for assistance in correcting heading is optional.

Although the invention has been shown and described with respect to preferred embodiments thereof, it should be understood by those skilled in the art that the foregoing and various other changes and omissions in the form and detail thereof may be made therein without departing from the spirit and the scope of the invention.

Having thus described typical embodiments of my invention, that which I claim as new and desire to secure by Letters Patent of the United States is:

1. A passive, ground-based system for assisting aircraft having radar apparatus to determine flight along a vector very near to a preferred approach vector to the end of a runway, comprising:

a plurality of reflectors disposed in proximity with an airport runway, a first group of said reflectors being disposed with respect to a preferred runway approach vector to reflect radar energy transmitted from the aircraft back to the aircraft when the aircraft is within a given relationship of said preferred vector, another of said reflectors being disposed with respect to said preferred vector to reflect radar energy transmitted from the aircraft back to the aircraft when the aircraft is aligned with said preferred vector, in a first direction, more closely than said given relationship, and still another of said reflectors being disposed with respect to said preferred vector to reflect radar energy transmitted from the aircraft back to the aircraft when the aircraft is aligned with said preferred vector, in a direction opposite to said first direction, more closely than said given relationship, whereby the patterns of reflections received from said reflectors, displayed on the radar scope of the aircraft, provide an indication of the relation of the aircraft approach vector to said preferred vector.

2. A system for deriving information indicative of the glide slope orientation of an aircraft having radar apparatus, as an aid in approaching a runway for a landing on a preferred vector comprising:

a plurality of reflectors disposed in proximity with an airport runway, a first group of said reflectors being disposed with respect to a preferred runway approach vector to reflect radar energy transmitted from the aircraft back to the aircraft when the aircraft is within a given relationship of said preferred vector, another of said reflectors being disposed with respect to said preferred vector to reflect radar energy transmitted from the aircraft back to the aircraft when the aircraft is aligned with said preferred vector, in a first direction, more closely than said given relationship, and still another of said reflectors being disposed with repsect to said preferred vector to reflect radar energy transmitted from the aircraft back to the aircraft when the aircraft is aligned with said preferred vector, in a direction opposite to said first direction, more closely than said given relationship;

means on said aircraft for illuminating said reflectors with radar radiation and for receiving reflected radiation from said reflectors when the aircraft is within the radiation pattern thereof; and means responsive to reflections received at said aircraft from said reflectors for providing an indication of the deviation of said aircraft from said desired approach vector.

3. A system according to claim 2 wherein said indication means includes a radar scope.

4. A system according to claim 2 wherein said reflectors are disposed in a line substantially parallel with the runway being approached by said aircraft and said first direction and said opposite direction respectfully correspond to altitudes which are too high and too low with respect to said preferred vector.

5. A system according to claim 4 wherein said indication means includes:

video signal processing means responsive to said radiation receiving means to recognize a pattern of reflected return signals in excess of a given magnitude corresponding with the pattern of reflections received from said plurality of said reflectors; and digital logic means for decoding the pattern of signals to determine and provide an indication of patterns resulting from aircraft altitudes which are too high and altitudes which are too low.

6. A system according to claim 5 further comprising:

means responsive to the elasped time between the time that said illumination means transmits and the time at which said digital logic means determines one of said patterns for providing an indication of the range of said reflectors from said aircraft.

* * * * *